Figure 1:
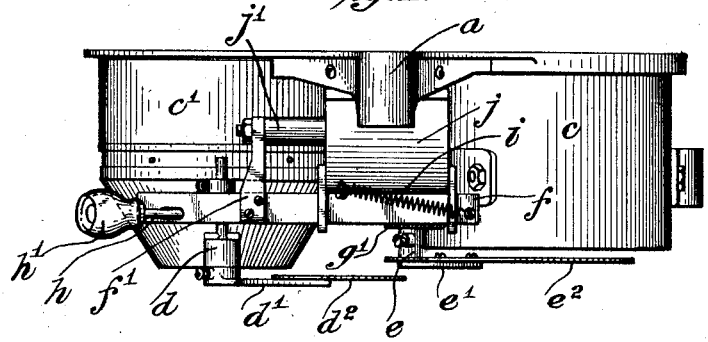

H. HIRSCH.
SHUTTER CONTROL FOR CINEMATOGRAPHIC TARGETS.
APPLICATION FILED DEC. 26, 1819.

1,392,941.

Patented Oct. 11, 1921.

WITNESS:

Henry Hirsch INVENTOR

Frank P. Wentworth
his ATTORNEY.

UNITED STATES PATENT OFFICE.

HENRY HIRSCH, OF NEW YORK, N. Y., ASSIGNOR TO LYDIA B. KOCH, OF NEW YORK, N. Y.

SHUTTER CONTROL FOR CINEMATOGRAPHIC TARGETS.

1,392,941.  Specification of Letters Patent.  Patented Oct. 11, 1921.

Application filed December 26, 1919. Serial No. 347,288.

*To all whom it may concern:*

Be it known that I, HENRY HIRSCH, a citizen of the United States, residing at the borough of Manhattan, city, county and State of New York, have invented certain new and useful Improvements in Shutter Controls for Cinematographic Targets, of which the following is a specification, reference being had therein to the accompanying drawings, which form a part thereof.

My invention relates to shutter controls for cinematographic targets, and more particularly to a construction of shutter for intercepting the light rays passing from the source of light to the moving picture film, adapted for use in connection with a type of projector employing a plurality of condensers which may be selectively brought into the operative relation to the source of light, according to whether the projector is to be used with a moving film or with a stereopticon plate.

In a shutter control made in accordance with my invention, I employ a movable shutter associated with each condenser, said shutters being so connected as to be simultaneously operative by a single actuating mechanism which may be electrically actuated by means of a control switch located at a point remote from the projector. The shutters, and the actuating means therefor, are mounted upon the pivotal frame supporting the condensers, so as to preserve the proper operative relation between each shutter and the condenser with which it is associated, and between the actuating mechanism and each of said shutters.

In addition to the above characteristics, the actuating mechanism is so constructed that the shutters may be either manually or electrically actuated, means being provided whereby both shutters will be normally maintained in a position at one side of the light opening of the condenser with which each shutter is associated.

The invention consists primarily in a shutter control for cinematographic targets embodying therein the combination with a movable frame carrying a plurality of condensers, of shutters pivotally mounted adjacent and adapted to be moved in relation to the light openings of said condensers respectively, operative connections between said shutters whereby they may be simultaneously actuated, means normally tending to hold said shutters from before the light openings of said condensers, and a magnet operatively connected with said connections, the circuit to said magnet being normally open, whereby upon the closing of said circuit, both shutters will have simultaneous movement imparted thereto, to obscure the light openings of both of said condensers, and in such other novel features of construction and combination of parts as are hereinafter set forth and described, and more particularly pointed out in the claims hereto appended.

Figure 2:
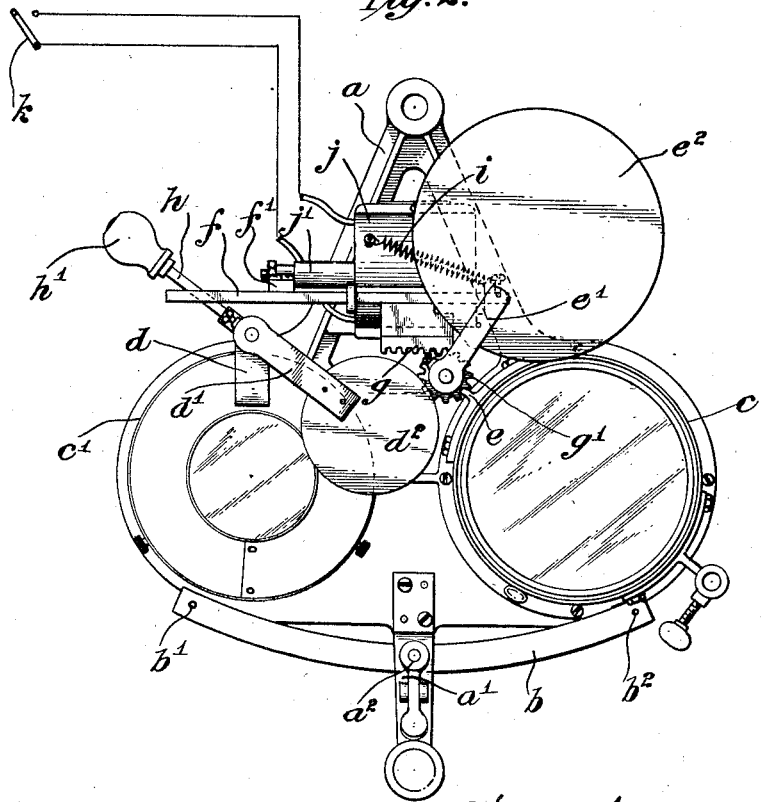

Referring to the drawings,

Figure 1 is a plan view of the condensers of a cinematographic projector having a control mechanism made in accordance with my invention applied thereto, and Fig. 2 is a front elevation thereof, the condensers being shown in neutral position in both of said views.

Like letters refer to like parts in both of said views.

In the accompanying drawings, I have illustrated the invention as applied to the condensers of a well known type of projector embodying therein a pivotal frame $a$, the lower end of which carries a shoe $a'$ slidably mounted upon a segmental guide rail $b$ carried by the lamp house of the projector. The rail $b$ has socket openings $b'$—$b^2$ adjacent opposite ends thereof adapted to be engaged by a bolt mechanism $a^2$ carried by the frame $a$, so that either condenser $c$ or $c'$ may be brought into axial alinement with the hood of the lamp house. The condenser $c$ is of the ordinary multiple lens type adapted to be used with stereoptican plates, while the condenser $c'$ has a single bull's eye lens. The type of projector with which said condensers are used employs an incandescent lamp as the source of light, in lieu of the usual arc lamp.

The foregoing construction forms no part of my invention, which relates more particularly to a shutter mechanism applicable for use in combination with the condenser structure described.

Pivotally mounted upon the bracket $d$ carried by the housing of the condenser $c'$, is an arm $d'$ having an opaque shutter blade $d^2$ adapted to be moved across the light opening of said condenser $c'$. Mounted upon the housing of the condenser $c$ is a bracket $e$ having pivotally mounted thereon an arm $e'$ carrying an opaque shutter blade $e^2$ adapted to be projected across the sight opening of said condenser $c$.

Mounted upon the frame $a$, and extending adjacent the arms $d'$ and $e'$ respectively, is a slide $f$ which is operatively connected to the arm $e'$ by means of a toothed rack $g$ carried by said slide, and a pinion $g'$ meshing therewith, carried by the arm $e'$. Said slide $f$ adjacent the condenser $c'$ has an elongated opening therein through which the stem $h$ carried by the arm $d'$ projects, so that with movement of said slide in either direction, simultaneous movement will be imparted to both shutters $d^2$ and $e^2$, but with that differential of movement necessitated by reason of the variance in the diameters of the two shutters.

Acting upon the slide $f$ is a spring $i$ having a normal tendency to impart such movement to said slide as will bring both shutter blades $d^2$—$e^2$ at one side of the sight openings of their respective condenser cases.

Mounted upon the frame $a$ is a solenoid $j$, the core $j'$ of which is connected with an arm $f'$ carried by the slide $f$.

The circuit to the solenoid $j$ is normally open, the controlling switch therefor indicated at $k$ being located at a point remote from the projector so that in the use of the target, the light rays passing to the screen may be intercepted at will, as when a lecturer desires to discourse upon some condition presented during the use of the target, and does not desire the attention of his hearers to be distracted by the presence of the image upon the screen.

To permit the manual operation of the shutter control, I provide the stem $h$ of the arm $d'$ with a handhold $h'$ so that the stem $h$ may be used to impart reciprocatory movement to the slide $f$ against the tension of the spring $i$ by an operator at the projector itself.

The operation of the herein described mechanism is substantially as follows:—

While the primary object of the invention is to provide a shutter control mechanism by means of which the screen may be darkened at will, the shutter blades will serve the further purpose of preventing possible ignition of the film as a result of the stoppage thereof during the interval while the screen is so darkened.

The blades may be used upon either side of the condenser casings.

Under normal working conditions the spring $i$ will act upon the slide $f$ in a manner to position both of the shutter blades $d^2$—$e^2$ as shown in the drawings at one side of the respective condenser casings, where they will not obstruct the light openings therein.

In the event of the lecturer desiring to darken the screen, it is merely necessary for him to close the circuit to the solenoid, or other magnet $j$, by means of the switch $k$, thereby energizing said solenoid to cause a movement of the core $j'$ inwardly thereof. This movement of said core will impart movement to the slide $f$ against the tension of the spring $i$, which movement, through the toothed rack $g$ and pinion $g'$ will move the shutter blade $e^2$ across the sight opening of the condenser $c$, the action of said slide upon the stem $h$ imparting similar movement to the shutter blade $d^2$. The slot in the slide $f$ through which the stem $h$ passes, will afford that lost motion necessary to permit the free oscillatory movement of the stem $h$ with a rectilineal movement of the slide $f$, and the leverage at which said slide acts upon said stem will limit the oscillatory movement of the shutter blade $d^2$ to that required to position it before the sight opening of the condenser $c'$.

By this construction the movement in arc, of the two shutter blades will be different, which is required because of the fact that the light opening of the condenser $c$ is relatively larger than that of the condenser $c'$.

Said blades $d^2$—$e^2$ will remain across the sight openings of their respective condensers so long as the circuit to the solenoid or other magnet $j$ is kept closed, but immediately upon the opening of the circuit to the solenoid $j$, the spring $i$ will act upon the slide $f$, to reverse its direction of movement with a resultant restoration of the shutter blades to their normal position at one side of the sight opening of each condenser, through the connections between said slide and said shutter blades respectively.

It will be observed that the shutter blades, the actuating mechanism therefor and the connections between said blades and said actuating mechanism, are so supported from the frame $a$ as to always have the same relation to each other, irrespective of change of position of the said frame.

By locating the pivotal support for the shutter outside of the condenser casing, and properly proportioning the arm carrying said blade, and said actuating mechanism, no part of the control mechanism excepting the blade can be positioned across the light opening of the condenser, and said blade may be so positioned as to intercept all light rays between the source of light and the film.

It is not my intention to limit the invention to the precise details of construction shown in the drawings, it being apparent that such may be varied without departing from the spirit and scope of the invention.

Having described the invention, what I claim as new and desire to have protected by Letters Patent, is:—

1. A shutter control for cinematographic targets embodying therein the combination with a movable frame carrying a plurality of condensers, of shutters pivotally mounted adjacent and adapted to be moved in relation to the light openings of said condensers respectively, operative connections between said shutters whereby they may be simultaneously actuated, means normally tending to move and hold said shutters from before the light openings of said condensers, and a magnet operatively connected with and adapted to positively actuate said connections, the circuit to said magnet being normally open, whereby upon the closing of said circuit, both shutters will have simultaneous movement imparted thereto, to obscure the light openings of both of said condensers.

2. A shutter control for cinematographic targets embodying therein the combination with a movable frame carrying a plurality of condensers, of shutters pivotally mounted upon said frame adjacent and adapted to be moved with relation to the light openings of said condensers respectively, a slide mounted upon said frame, connections between said slide and said shutters respectively, whereby rectilineal movement of said slide will impart simultaneous oscillatory movement to said shutters, a spring acting on said slide normally tending to so position it as to hold said shutters from before the light openings of said condensers, and a magnet operatively connected with said slide, the circuit to said magnet being normally open, whereby upon the closing of said circuit, both shutters will have simultaneous movement imparted thereto, to obscure the light openings of both of said condensers.

3. A shutter control for cinematographic targets embodying therein the combination with a movable frame carrying two condensers, of two shutters pivotally mounted upon said frame adjacent and adapted to be moved with relation to the light openings of said condensers respectively, a slide mounted upon said frame, said slide adjacent one of said shutters having an elongated opening therein, a stem carried by said shutter extending through said opening, a rack carried by said slide, a pinion carried by said other shutter meshing with said rack, whereby rectilineal movement of said slide will impart simultaneous oscillatory movement to said shutters, a spring acting on said slide normally tending to so position it as to hold said shutters from before the light openings of said condensers, and a magnet operatively connected with said slide, the circuit to said magnet being normally open, whereby upon the closing of said circuit, both shutters will have simultaneous movement imparted thereto, to obscure the light openings of both of said condensers.

4. A shutter control for cinematographic targets embodying therein the combination with a movable frame carrying two condensers, of two pivotal arms mounted without said condenser casings respectively, a shutter blade carried by each of said arms and adapted to be moved with relation to the light openings of said condensers respectively, a slide mounted upon said frame, said slide adjacent one of said arms having an elongated opening therein, a stem carried by said arm extending through said opening, a rack carried by said slide, a pinion carried by said other arm meshing with said rack, whereby rectilineal movement of said slide will impart simultaneous oscillatory movement to said shutter blades, a spring acting on said slide normally tending to so position it as to hold said shutter blades from before the light openings of said condensers, and a magnet operatively connected with said slide, the circuit to said magnet being normally open, whereby upon the closing of said circuit, both shutter blades will have simultaneous movement imparted thereto, to obscure the light openings of both of said condensers.

5. A shutter control for cinematographic targets embodying therein a pivotal arm mounted without the casing of a condenser, a shutter blade carried by said arm and adapted to be brought across or to one side of the light opening of a condenser, a pinion carried by said arm, a slidable rack meshing with said pinion, a spring acting upon said rack to normally position it so as to bring the shutter blade at one side of the light opening, and an electromagnet operative upon said slidable rack, the pull of which magnet is opposed to that of said spring, the circuit to said magnet being normally open, whereby upon the closing of said circuit, the shutter blade will be so moved as to obscure the light opening of the condenser, and with the opening of said circuit, said spring will become operative to restore said shutter blade to its normal position at one side of said light opening.

In witness whereof I have hereunto affixed my signature, in the presence of two subscribing witnesses, this 22 day of December 1919.

HENRY HIRSCH.

Witnesses:
HERMINA C. HOLL,
C. F. THOMPSON.